United States Patent
Rische et al.

(10) Patent No.: US 7,176,254 B2
(45) Date of Patent: Feb. 13, 2007

(54) SIZING COMPOSITION

(75) Inventors: Thorsten Rische, Unna (DE); Karin Naujoks, Odenthal (DE); Thomas Feller, Solingen (DE); Christoph Gürtler, Köln (DE); Jan Mazanek, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 169 days.

(21) Appl. No.: 10/457,862

(22) Filed: Jun. 10, 2003

(65) Prior Publication Data

US 2003/0232907 A1   Dec. 18, 2003

(30) Foreign Application Priority Data

| Jun. 17, 2002 | (DE) | ................ 102 26 924 |
| Jun. 17, 2002 | (DE) | ................ 102 26 925 |
| Jun. 17, 2002 | (DE) | ................ 102 26 926 |
| Jun. 17, 2002 | (DE) | ................ 102 26 927 |
| Jun. 17, 2002 | (DE) | ................ 102 26 931 |

(51) Int. Cl.
- *D02G 3/00* (2006.01)
- *C08F 8/30* (2006.01)
- *C08J 3/00* (2006.01)
- *C08K 3/20* (2006.01)
- *C08L 75/00* (2006.01)

(52) U.S. Cl. ................ 524/591; 428/425.6; 428/361; 428/375; 428/378; 524/589; 524/590; 524/839; 524/840; 525/124; 525/455

(58) Field of Classification Search ............. 524/591, 524/839, 840, 589, 590; 525/124, 455; 428/425.6, 428/361, 375, 378
See application file for complete search history.

(56) References Cited

U.S. PATENT DOCUMENTS

| 4,098,933 | A | | 7/1978 | Burkhardt et al. ........... 427/379 |
| 4,284,544 | A | | 8/1981 | Wegner et al. ....... 260/29.2 TN |
| 4,482,721 | A | | 11/1984 | Wegner et al. .............. 548/262 |
| 4,495,229 | A | | 1/1985 | Wolf et al. .............. 427/388.2 |
| 4,658,005 | A | * | 4/1987 | Gras et al. .................... 528/45 |
| 4,976,837 | A | | 12/1990 | Hughes et al. .......... 204/181.7 |
| 5,157,074 | A | | 10/1992 | Metzger et al. ............. 524/589 |
| 5,246,557 | A | | 9/1993 | Hughes et al. .......... 204/181.4 |
| 5,294,665 | A | | 3/1994 | Pedain et al. ............... 524/591 |
| 5,352,755 | A | | 10/1994 | Hughes et al. ................ 528/45 |
| 5,455,297 | A | | 10/1995 | Pedain et al. ............... 524/591 |
| 5,621,063 | A | | 4/1997 | Wolf et al. .................... 528/45 |
| 5,723,536 | A | | 3/1998 | Baumbach et al. ......... 524/591 |
| 5,804,647 | A | | 9/1998 | Nachtkamp et al. ........ 524/591 |
| 5,922,806 | A | | 7/1999 | Blum et al. ................. 524/591 |
| 5,961,878 | A | | 10/1999 | König et al. ........... 252/182.21 |
| 5,986,033 | A | | 11/1999 | Hughes et al. ................ 528/45 |
| 6,063,860 | A | | 5/2000 | Rimmer et al. ............. 524/590 |
| 6,368,669 | B1 | | 4/2002 | Hughes et al. ........... 427/385.5 |

FOREIGN PATENT DOCUMENTS

CA   2186089   8/1997

* cited by examiner

*Primary Examiner*—Patrick D. Niland
(74) *Attorney, Agent, or Firm*—Joseph C. Gil

(57) ABSTRACT

Novel sizing compositions, their preparation and use. The compositions contain water-dispersible and/or water-soluble and alkylamine-blocked polyisocyanates, film-forming resins, coupling agents and lubricants. The isocyanates are synthesized from at least one polyisocyanate, at least one ionic and/or potentially ionic and/or nonionic compound, and at least one blocking agent which is at least 20% by weight aralkylamines.

12 Claims, No Drawings

SIZING COMPOSITION

CROSS REFERENCE TO RELATED PATENT APPLICATION

The present patent application claims the right of priority under 35 U.S.C. §119 (a)–(d) of German Patent Applications No. 10226927.0, 10226931/9, 10226926.2, 10226925.4, and 10226924.6, all filed Jun. 17, 2002.

BACKGROUND OF THE INVENTION

1. Field of the Invention

The invention relates to novel sizing compositions, their preparation and use.

2. Description of the Related Art

The use of curing components in sizes based on blocked polyisocyanates is known, for example, from EP-A 0 792 900. Aralkylamine-blocked polyisocyanates and their particular suitability in sizes, especially glass fibre sizes, is not described.

The major compounds used for the blocking of polyisocyanates are $\epsilon$-caprolactam, butanone oxime, malonates, secondary amines, and triazole and pyrazole derivatives, as described, for example, in patents EP-A 0 576 952, EP-A 0 566 953, EP-A 0 159 117, U.S. Pat. No. 4,482,721, WO 97/12924 or EP-A 0 744 423.

Secondary amine blocking agents, including aralkyl-substituted amines, are known from EP-A 0 096 210. The use of such amines in aqueous systems, particularly in sizes, however, is not known from EP-A 0 096 210.

Although the formula depicted on page 2, lines 20–24 of EP-A 0 096 210 embraces a large number of diamines, page 3 line 8 ff. nevertheless points out that all secondary amines are suitable blocking agents. According to page 5 lines 20–29, only a very small number of such diamines is listed as being suitable. The examples on page 9 and 10 as well relate only to dialkylamines such as diisopropylamine, substituted secondary cycloaliphatic amines such as substituted cyclohexylamines or cycloaliphatic N-heterocycles such as 2,2,4,6 tetramethylpiperidine. With the exception of diisopropylamine, these compounds are reacted with isocyanates at temperatures of at least 120° C., and so the person skilled in the art must assume that the elimination of these blocking agents, necessary for further reaction, takes place only at much higher temperatures.

EP-A 0 178 398 specified solid blocked isophorone diisocyanate as a curing agent for powder coating materials. Here again, aralkyl-substituted secondary amines as blocking agents and N-tert-butyl-benzylamine were mentioned, albeit without a specific example. EP-A 0 787 754 claimed such blocking agents for selected polyisocyanates as curing agents for powder coating materials; N-tert-butyl-benzylamine or other aralkyl-substituted diamines, however, are mentioned neither in the disclosure nor in the examples. Liquid solvent-based formulations or aqueous or water-dilutable blocked polyisocyanates, and especially their suitability for sizes, are mentioned in neither document.

In preparing sizes, especially glass fibre sizes, water-dispersible or water-soluble isocyanates are used, usually blocked with $\epsilon$-caprolactam and butanone oxime.

Whereas in the case of $\epsilon$-caprolactam-blocked isocyanates it is common to employ baking temperatures around 160° C., blocked curing agents for which butanone oxime was the blocking agent used can be deblocked at temperatures 10–20° C. lower. At these temperatures, however, in many sizes the desired properties are no longer achieved. Moreover, high deblocking and/or drying temperatures often result in an unwanted thermal yellowing of the sizes. Furthermore, these deblocking temperatures are now perceived as being too high, on cost grounds, so giving rise to a demand for sizes comprising crosslinker systems which crosslink at lower temperatures than in the case of butanone oxime.

The principle of the preparation of water-dispersible or water-soluble blocked polyisocyanates is known and is described, for example, in DE-A 24 56 469 and DE-A 28 53 937.

BRIEF SUMMARY OF THE INVENTION

The object of the present invention is therefore to provide sizing compositions comprising water-dispersible or water-soluble blocked isocyanates having a significantly lower deblocking temperature as compared with prior art curing agents.

It has now been found that sizes comprising hydrophilicized and aralkylamine-blocked polyisocyanates which are soluble or dispersible in water meet the above-mentioned profile of requirements and as well as a much lower crosslinking temperature exhibit a significantly improved hydrolysis resistance.

The present invention accordingly provides sizing compositions comprising:
1) water-dispersible and/or water-soluble and aralkylamine-blocked polyisocyanates,
2) film-forming resins,
3) coupling agents,
4) lubricants,
5) if desired, antistats, and
6) if desired, further additives and auxiliaries.

The water-dispersible and/or water-soluble blocked polyisocyanates 1) are synthesized from:
A) at least one polyisocyanate containing aliphatically, cycloaliphatically araliphatically and/or aromatically attached isocyanate groups,
B) at least one ionic and/or potentially ionic and/or nonionic compound,
C) at least one blocking agent of which at least 20% by weight consists of aralkylamines,
D) if desired, one or more (cyclo)aliphatic monoamines and/or polyamines having from 1 to 4 amino groups, from the molecular weight range up to 300,
E) if desired, one or more polyhydric alcohols having from 1 to 4 hydroxyl groups, from the molecular weight range up to 250 and
F) if desired, stabilizers and other auxiliaries, and
  G) if desired, solvents.

DETAILED DESCRIPTION OF THE INVENTION

As used herein, unless otherwise expressly specified, all of the numerical ranges, amounts, values and percentages such as those for amounts of materials, times and temperatures of reaction, ratios of amounts, values for molecular weight, and others in the following portion of the specification may be read as if prefaced by the word "about" even though the term "about" may not expressly appear with the value, amount or range.

The term "molecular weight range" refers to a molecular weight approximately equal to that of the monomeric form of the identified substance, or to that of the simplest member of a group of substances having an identified functional group.

The water-dispersible and/or water-soluble, aralkylamine-blocked polyisocyanates 1) preferably contain from 20 to 80% by weight of component A), from 1 to 40% by weight of component B), from 15 to 60% by weight of component C) from 0 to 15% by weight of component D), from 0 to 15% by weight of component E) from 0 to 15% by weight of component F) and from 0 to 20% by weight of component G), the sum of A to G) adding up to 100% by weight.

The water-dispersible and/or water-soluble, aralkylamine-blocked polyisocyanates 1) contain with particular preference from 25 to 75% by weight of component A), from 1 to 35% by weight of component B), from 20 to 50% by weight of component C), from 0 to 10% by weight of component D), from 0 to 10% by weight of component E), from 0 to 10% by weight of component F) and from 0 to 15% by weight of component G), the sum of A to G) adding up to 100% by weight.

The water-dispersible and/or water-soluble, aralkylamine-blocked polyisocyanates 1) contain with very particular preference from 30 to 70% by weight of component A) from 5 to 30% by weight of component B), from 25 to 45% by weight of component C), from 0 to 5% by weight of component D), from 0 to 5% by weight of component E), from 0 to 5% by weight of component F) and from 0 to 10% by weight of component G), the sum of A to G) adding up to 100% by weight.

The water-dispersible blocked polyisocyanates 1) can be used in the sizes of the invention as an aqueous solution or dispersion. The solution or dispersion of the polyisocyanates 1) has a solids content of between 10 to 70% by weight, preferably from 20 to 60% by weight and with particular preference from 25 to 50% by weight and the fraction of G) in the overall composition is preferably less than 15% by weight and with particular preference less than 10% by weight and with very particular preference less than 5% by weight.

The blocked polyisocyanates 1) have an (average) NCO functionality of from 2.0 to 5.0, preferably from 2.3 to 4.5, an isocyanate groups (nonblocked and blocked) content of from 5.0 to 27.0% by weight, preferably from 14.0 to 24.0% by weight and a monomeric diisocyanate content of less than 1% by weight, preferably less than 0.5% by weight. At least 50%, preferably at least 60% and with particular preference at least 70% of the isocyanate groups of the polyisocyanates A) of the water-dispersible and/or water-soluble blocked polyisocyanates 1) are in blocked form.

Suitable polyisocyanates A) are polyisocyanates which have a uretdione, isocyanurate, allophanate, biuret, iminooxadiazinedione and/or oxadiazinetrione structure which are prepared by modifying simple aliphatic, cycloaliphatic, araliphatic and/or aromatic diisocyanates and are synthesized with at least two diisocyanates, such polyisocyanates being as described by way of example in, for example, J. Prakt. Chem. 336 (1994) page 185–200.

Suitable diisocyanates for preparing the polyisocyanates A) are diisocyanates from the molecular weight range from 140 to 400 which are obtainable by phosgenation or by phosgene-free processes, for example by thermal urethane cleavage, and contain aliphatically, cycloaliphatically, araliphatically and/or aromatically attached isocyanate groups, such as, for example, 1,4-diisocyanatobutane, 1,6-diisocyanatohexane (HDI), 2-methyl-1,5-diisocyanatopentane, 1,5-diisocyanato-2,2-dimethylpentane, 2,2,4- and/or 2,4,4-trimethyl-1,6-diisocyanatohexane, 1,10-diisocyanatodecane, 1,3- and 1,4-diisocyanatohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3)isocyanato-methylcyclohexane, bis(isocyanatomethyl)-norbornane, 1,3- and 1,4-bis(2-isocyanatoprop-2-yl)benzene (TMXDI), 2,4- and 2,6-diisocyanatotoluene (TDI), 2,4'- and 4,4'-diisocyanatodiphenylmethane, 1,5-diisocyanatonaphthalene or any desired mixtures of such diisocyanates.

The starting components A) are preferably polyisocyanates or polyisocyanate mixtures of the type mentioned, containing exclusively aliphatically and/or cycloaliphatically attached isocyanate groups.

More preferred starting components A) are polyisocyanates or polyisocyanate mixtures having an isocyanurate and/or biuret structure, based on HDI, IPDI and/or 4,4'-diisocyanatodicyclohexylmethane.

Suitable compounds for component B) are ionic or potentially ionic and/or nonionic compounds.

Nonionic compounds are, for example, monohydric polyalkylene oxide polyether alcohols containing on average from 5 to 70, preferably from 7 to 55, ethylene oxide units per molecule, such as are obtainable conventionally by alkoxylating suitable starter molecules (e.g. in Ullmanns Encyclopadie der technischen Chemie, 4th Edition, Volume 19, Verlag Chemie, Weinheim pp. 31–38). Examples of suitable starter molecules are saturated monoalcohols such as methanol, ethanol, n-propanol, isopropanol, n-butanol, isobutanol, sec-butanol, the isomers pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane, or tetrahydrofurfuryl alcohol; diethylene glycol monoalkyl ethers such as diethylene glycol monobutyl ether, for example; unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol; secondary monoamines such as dimethylamine, diethylamine, dipropylamine, diisopropylamine, dibutylamine, bis(2-ethylhexyl)amine, N-methyl- and N-ethylcyclohexylamine or dicyclohexylamine and also heterocyclic secondary amines such as morpholine, pyrrolidine, piperidine or 1H-pyrazole.

Preferred starter molecules are saturated monoalcohols and also diethylene glycol monoalkyl ethers. More preference is given to using diethylene glycol monobutyl ether as a starter molecule.

Alkylene oxides suitable for the alkoxylation reaction are, in particular, ethylene oxide and propylene oxide, which can be used in any order or else in a mixture in the alkoxylation reaction.

The polyalkylene oxide polyether alcohols are either pure polyethylene oxide polyethers or mixed polyalkylene oxide polyethers, at least 30 mol % preferably at least 40 mol % of whose alkylene oxide units consist of ethylene oxide units. Preferred nonionic compounds are monofunctional mixed polyalkylene oxide polyethers containing at least 40 mol % ethylene oxide units and not more than 60 mol % propylene oxide units.

Suitable compounds for component B) are likewise ionic or potentially ionic compounds which can be used in addition to or instead of the nonionic compounds, such as, for example, mono- and dihydroxycarboxylic acids, mono- and diaminocarboxylic acids, mono- and dihydroxysulfonic acids, mono- and diaminosulfonic acids, and also mono- and dihydroxyphosphonic acids and/or mono- and diaminophosphonic acids and their salts such as dimethylolpropionic acid, hydroxypivalic acid, N-(2-aminoethyl)-β-alanine, 2-(2-aminoethyl-amino)ethanesulfonic acid, ethylenediamine-propyl- or butylsulfonic acid, 1,2- or 1,3-propylenediamine-β-ethylsulfonic acid, lysine, 3,5-diaminobenzoic acid, the hydrophilicizing agent according to Example 1 of EP-A 0 916 647 and the alkali metal salts and/or ammonium salts thereof; the adduct of sodium bisulfite with but-2-ene-1,4-diol, polyethersulfonate, the propoxylated adduct of 2-butenediol and NaHSO₃ (e.g. in DE-A 2 446 440, page 5–9, formula I-III), and building blocks which can be converted into cationic groups, such as N-methyldiethanolamine, are used as hydrophilic synthesis components. Preferred ionic or potential ionic compounds B) are those which possess carboxyl or carboxylate and/or sulfonate groups and/or ammonium groups. Particularly preferred ionic compounds B) are those containing carboxyl and/or sulfonate groups as ionic or potentially ionic groups, such as the salts of N-(2-aminoethyl)-β-alanine, 2-(2-aminoethylamino) ethanesulfonic acid, of the hydrophilicizing agent according to Example 1 of EP-A 0 916 647 and of dimethylolpropionic acid.

Component B) is preferably a combination of nonionic and ionic hydrophilicizing agents. Particular preference is given to combinations of nonionic and anionic hydrophilicizing agents.

As an example of blocking agents C) according to the invention, mention may be made of the following: N-methyl-, N-ethyl-, N-(iso)propyl-, N-n-butyl-, N-iso-butyl-, N-tert-butyl-benzylamine or 1,1-dimethylbenzylamine, N-alkyl-N-1,1-dimethylmethylphenylamine, adducts of benzylamine with compounds having activated double bonds such as malonates, N,N-dimethylaminopropyl-benzylamine and other, optionally substituted benzylamines containing tertiary amino groups, and/or dibenzylamine. Naturally it is also possible to use mixtures of these amines with one another and/or with other blocking agents. These are, for example, alcohols, lactams, oximes, malonic esters, alkyl acetoacetates, triazoles, phenols, imidazoles, pyrazoles, and amines, such as butanone oxime, diisopropylamine, 1,2,4-triazole, dimethyl-1,2,4-triazole, imidazole, diethyl malonate, ethyl acetoacetate, acetone oxime, 3,5-dimethylpyrazole, ε-caprolactam or any desired mixtures of these blocking agents. Preference is given to using N-aralkylamines such as N-(iso)propyl-, N-n-butyl-, N-iso-butyl-, N-tert-butyl-benzylamine as blocking agents C). A more preferred blocking agent C) is N-tert-butylbenzylamine.

Suitable components D) include mono-, di-, tri-, and/or tetra-amino-functional substances from the molecular weight range up to 300, such as ethylenediamine, 1,2- and 1,3-diaminopropane, 1,3-, 1,4- and 1,6-diaminohexane, 1,3-diamino-2,2-dimethylpropane, 1-amino-3,3,5-trimethyl-5-aminoethylcyclohexane (IPDA), 4,4'-diaminodicyclohexylmethane, 2,4- and 2,6-diamino-1-methylcyclohexane, 4,4'-di amino-3,3'-dimethyldicyclohexylmethane, 1,4-bis(2-aminoprop-2-yl)cyclo-hexane or mixtures of these compounds.

Component E) comprises mono-, di-, tri- and/or tetrahydroxy-functional substances of molecular weight up to 250, such as ethylene glycol, propylene glycol, 1,4-butanediol, 1,6-hexanediols, glycerol, trimethylolethane, trimethylolpropane, the isomeric hexanetriols, pentaerythritol or mixtures of these compounds.

The water-dispersible and/or water-soluble blocked polyisocyanates 1) may optionally comprise a stabilizer or stabilizer mixture F). Suitable compounds F) are, for example, antioxidants such as 2,6-ditert-butyl-4-methylphenol, UV absorbers of the 2-hydroxyphenylbenzotriazole type or light stabilizers of the HALS compound type or other commercially customary stabilizers, as described in, for example, "Lichtschutzmittel für Lacke" (A. Valet, Vincentz Verlag, Hanover, 1996) and "Stabilization of Polymeric Materials" (H. Zweifel, Springer Verlag, Berlin, 1997, Appendix 3, pp. 181–213).

Preference is given to stabilizer mixtures featuring firstly compounds having a 2,2,6,6-tetramethylpiperidinyl radical (HALS ring). The piperidinyl nitrogen of the HALS ring is not substituted and has no hydrazide structures at all. More preference is given to a compound of the formula (I)

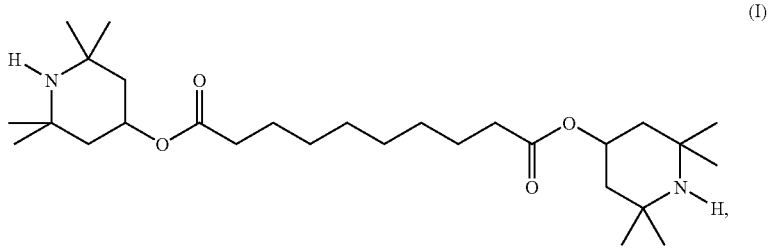

(I)

which is sold, for example, under the name Tinuvin® 770 DF by the company Ciba Spezialitäten (Lampertheim, Del.).

Ideally, the abovementioned compounds are combined with substances possessing hydrazide structures, such as acid hydrazides and acid dihydrazides, for example acetic hydrazide adipic hydrazide, or adipic dihydrazide, or else hydrazine adducts of hydrazine and cyclic carbonates, as specified in, for example, EP-A 0 654 490 (p. 3, line 48 to p. 4 line 3). Preference is given to using adipic dihydrazide and an adduct of 2 mol of propylene carbonate and 1 mol of hydrazine, of the general formula (II)

—CO—NH—NH— (II)

More preference is given to the adduct of 2 mol of propylene carbonate and 1 mol of hydrazine, of the general formula (III):

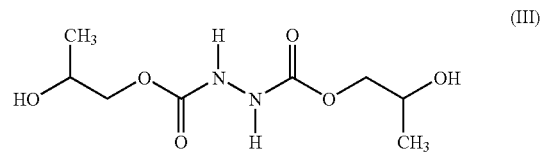

(III)

Suitable organic solvents G) are the conventional paint solvents, such as ethyl acetate, butyl acetate, 1-methoxy-2-propyl acetate, 3-methoxy-n-butyl acetate, acetone, 2-butanone, 4-methyl-2-pentanone, cyclohexanone, toluene, xylene, chlorobenzene or white spirit. Mixtures comprising in particular aromatics with relatively high degrees or substitution, such as are commercially available, for example, under the names Solvent Naphtha, Solvesso® (Exxon Chemicals, Houston, USA), Cypar® (Shell Chemicals, Eschborn, Del.), Cyclo Sol® (Shell Chemicals, Eschborn, Del.), Tolu Sol® (Shell Chemicals, Eschborn, Del.), Shellsol® (Shell Chemicals, Eschborn, Del.), are likewise suitable. Further solvents are, for example, carbonates, such as dimethyl carbonate, diethyl carbonate, 1,2-ethylene carbonate and 1,2-propylene carbonate, lactones, such as β-propiolactone, γ-butyrolactone, ε-caprolactone, ε-methylcaprolactone, propylene glycol diacetate, diethylene glycol dimethyl ether, dipropylene glycol dimethyl ether, diethylene glycol ethyl and butyl ether acetate, N-methyl-pyrrolidone and N-methylcaprolactam, or any desired mixtures of such solvents. Preferred solvents are acetone, 2-butanone, 1-methoxy-2-propyl acetate, xylene, toluene, mixtures comprising in particular aromatics with relatively high degrees or substitution, such as are commercially available, for example, under the names Solvent Naphtha, Solvesso® (Exxon Chemicals, Houston, USA), Cypar® (Shell Chemicals, Eschborn, Del.), Cyclo Sol® (Shell Chemicals, Eschborn, Del.), Tolu Sol® (Shell Chemicals, Eschborn, Del.), Shellsol® (Shell Chemicals, Eschborn, Del.), and N-methylpyrrolidone. More preference is given to acetone, 2-butanone and N-methylpyrrolidone.

The preparation of the water-dispersible blocked polyisocyanates 1) can take place in accordance with known methods of the prior art (e.g. in DE-A 2 456 469, column 7–8, Example 1–5 and DE-A 2 853 937 pp. 21–26, Example 1–9).

The water-dispersible and/or water-soluble blocked polyisocyanates 1) are obtained by reacting components A), B), C) and, if desired, D), E), F) in any order with the assistance where appropriate of an organic solvent G).

Preferably, first of all, A) is reacted with, where appropriate, a part, preferably the nonionic part, of component B) and also, where appropriate, D) and E). Then blocking with component C) takes place, followed by reaction with the part of component B) that contains ionic groups. Where appropriate, organic solvents G) can be added to the reaction mixture. In a further step, where appropriate, component F) is added.

The preparation of the aqueous solution or dispersion takes place subsequently, by converting the water-dispersible, aralkylamine-blocked polyisocyanates into an aqueous dispersion or solution by adding water. The organic solvent G), where used, can be removed by distillation following dispersion. It is preferred not to use solvent G)

For the preparation of the aqueous solution or dispersion comprising the water-dispersible blocked polyisocyanates 1) the amounts of water used are generally such that the resulting dispersions or solutions have a solids content of from 10 to 70% by weight, preferably from 20 to 60% by weight and with more preference from 25 to 50% by weight.

Suitable film-forming resins 2) are polymers which are soluble, emulsifiable or dispersible in water. Examples are polyester polymers or epoxy-functional polyester polymers, polyurethanes, acrylic polymers, vinyl polymers such as polyvinyl acetate, polyurethane dispersions, polyacrylate dispersions, polyurethane-polyacrylate hybrid dispersions, polyvinyl ether and/or polyvinyl ester dispersions, polystyrene and/or polyacrylonitrile dispersions, which can be used both in mixtures and in combination with further blocked polyisocyanates and amino crosslinker resins such as melamine resins, for example. The solids content of the film-forming resins is preferably from 10 to 100% by weight with more preference from 30 to 100% by weight.

Coupling agents 3) used are, for example, the known silane coupling agents, examples being 3-aminopropyltrimethoxy- or triethoxysilane, N-(2-aminoethyl)-3-aminopropyltrimethoxysilane, 3-glycidylpropyltrimethoxysilane, vinyltrimethoxysilane, vinyltriethoxysilane or 3-methacryloyloxypropyl-triethoxysilane. The concentration of the silane coupling agents in the sizing agents of the invention is preferably from 0.05 to 2% by weight with particular preference from 0.15 to 0.85% by weight based on the overall size.

The sizes of the invention comprise one or more nonionic and/or ionic lubricants 4) contained, which may be composed, for example, of the following substance groups: polyalkylene glycol ethers of fatty alcohols or fatty amines, polyalkylene glycol ethers and glycerol esters of fatty acids having 12 to 18 carbon atoms, polyalkylene glycols, higher fatty acid amides having 12 to 18 carbon atoms of polyalkylene glycols and/or alkyleneamines, quaternary nitrogen compounds, for example ethoxylated imidazolinium salts, mineral oils and waxes. The lubricants or lubricants are preferably employed in the overall concentration of between 0.05 and 1.5% by weight based on the overall size.

The sizing agents of the invention may comprise one or more antistats 5), such as lithium chloride, ammonium chloride, Cr(III) salts, organotitanium compounds, arylalkyl sulfates or sulfonates, aryl polyglycol ether sulfonates or quaternary nitrogen compounds. The antistats are preferably employed in concentrations of from 0.01 to 0.8% by weight.

Furthermore, the sizes of the invention additionally comprise, where appropriate, other auxiliaries and additives 6) known from the prior art, such as are described in, for example, K. L. Loewenstein "The Manufacturing Technology of Continous Glass Fibres", Elsevier Scientific Publishing Corp., Amsterdam, London, New York, 1983.

The sizes can be prepared by the methods known per se. Preferably, about half of the total amount of water needed is charged to a suitable mixing vessel and, with stirring, the binder 2), the curing agent 1), and then the lubricant 4) and, where appropriate, other, customary auxiliaries 6) are added. Thereafter the pH is adjusted to 5–7 and then hydrolysate of a coupling agent, for example of a trialkoxysilane, prepared according to the specifications of the manufacturer (e.g. UCC, New York) is added. After a further stirring time of 15 minutes, the size is ready to use; where appropriate, the pH is readjusted to 5–7.

The sizes can be applied to a suitable substrate by any desired methods, for example with the aid of suitable equipment, such as spray applicators or roll applicators, for example. Suitable substrates are selected for example from the group consisting of metal, wood, glass, glass fibres, carbon fibres, stone, ceramic minerals, concrete, hard and flexible plastics of a wide variety of kinds, woven and non-woven textiles, leather, paper, hard fibres, straw and bitumen which may also have been provided, where appropriate, with customary primers prior to sizing. Preferred substrates are glass fibres, carbon fibres, metals, textiles and leather. A particularly preferred substrate is the glass fibre.

Glass types suitable for the sized glass fibres include not only the known glass types used for fibre glass manufacture, such as E, A, C, and S glass, but also the other conventional products of the glass fibre producers. Among the types of glass mentioned, for the production of continuous glass fibres, the E glass fibres possess the greatest importance for the reinforcement of plastics, owing to their freedom from alkali, high tensile strength and high modulus of elasticity.

The method of production, the method of sizing and the subsequent processing of the glass fibres is known and is described in, for example, K. L. Loewenstein "The Manufacturing Technology of Continous Glass Fibres", Elsevier Scientific Publishing Corp., Amsterdam, London, New York, 1983.

The sizes are normally applied to the glass filaments, drawn at high speed from spinnerets, immediately following the solidification of the said filaments, i.e. even before they are wound up. An alternative option, however, is to size the fibres in a dip bath, following the spinning operation. The sized glass fibres can be processed either wet or dry to give, for example, chopped glass. The end product or intermediate is dried at temperatures between 50 to 200° C., preferably 90 to 150° C. Drying in this context means not solely the removal of other volatile constituents but also, for example, the solidification of the size constituents. Only after drying is at an end has the size become the finished coating material. The fraction of the size, based on the sized glass fibres, is preferably from 0.1 to 5.0% by weight with particular preference from 0.1 to 3.0% by weight and with very particular preference from 0.3 to 1.5% by weight.

As matrix polymers it is possible to use a multiplicity of thermoplastics and polymers which can be cured to thermosets. Examples of suitable thermoplastic polymers include the following: polyolefins such as polyethylene or polypropylene, polyvinyl chloride, addition polymers such as styrene/acrylonitrile copolymers, ABS, polymethacrylate or polyoxymethylene, aromatic and/or aliphatic polyamides such as polyamide-6 or polyamide-6,6, polycondensates such as polycarbonate, polyethylene terephthalate, liquid-crystalline polyaryl esters, polyarylene oxide, polysulfone, polyarylene sulfide, polyaryl sulfone, polyether sulfone, polyaryl ether or polyether ketone or polyadducts such as polyurethanes. Examples that may be mentioned are polymers which can be cured to thermosets include the following: epoxy resins, unsaturated polyester resins, phenolic resins, amine resins, polyurethane resins, polyisocyanurates, epoxy/isocyanurate combination resins, furan resins, cyanurate resins and bismaleimide resins.

The present invention likewise provides for the use of the sizing composition of the invention for producing sized glass fibres.

The present invention additionally provides glass fibres sized with the sizes of the invention.

EXAMPLES

The mechanical properties of the sizes of the invention are determined on free films. Preparation of the free films requires not the complete sizing compositions but only the film-forming constituents such as the water-dispersible block polyisocyanate 1) and a film-forming resin 2), which are mixed with one another, since only these are determinants of the mechanical properties and also the hydrolysis resistance of the size. The mixtures stated are prepared from 60% by weight of Baybond PU 401 (anionic-nonionic PU dispersion having a solids content of 40% and an average particle size of 100–300 nm, Bayer AG, DE (film-forming resin 2)) and 40% by weight of a corresponding water-dispersible or water-soluble blocked polyisocyanate 1). The free films are produced from these mixtures as follows: in a film applicator composed of two polished rolls, which can be set an exact distance apart, a release paper is inserted in front of the back roll. The distance between paper and front roll is adjusted using a feeler gauge.

This distance corresponds to the (wet) film thickness of the resulting coating, and can be adjusted to the desired application rate of each coating. It is also possible to carrying out coating consecutively in two or more coats. To apply the individual coats, the products (aqueous formulations are adjusted to a viscosity of 4500 mpa·s beforehand by adding ammonia/polyacrylic acid) are poured onto the nip between paper and front roll, the release paper is pulled away vertically downwards, and the corresponding film is formed on the paper. Where two or more coats are applied, each individual coat is dried and the paper is reinserted.

The 100% modulus is determined in accordance with DIN 53504 on films >100 μm in thickness.

Film storage under hydrolysis conditions takes place in accordance with DIN EN 12280-3. The mechanical properties of these film samples are determined after 24 hours of storage under standard climate conditions (20° C. and 65% air humidity) in accordance with DIN 53504.

The average particle sizes (the parameter stated is the numerical average) of the PU dispersions were determined by means of laser correlation spectroscopy (instrument: Malvern Zetasizer 1000, Malver Inst. Limited).

The mixtures set out below, comprising water-dispersible and/or water-soluble and aralkylamine-blocked polyisocyanates, can be converted into sizes of the invention by formulating them with the conventional lubricants 4), coupling agents 3) and antistats 5) in a manner which is likewise conventional.

Example 1 (Inventive)

108.4 g of a polyisocyanate based on 1,6-diisocyanato-hexane (HDI), containing biuret groups and having an NCO content of 23.0%, are taken at 40° C. Over the course of 10 minutes, 91.1 g of Polyether LB 25 (Bayer AG, DE, monofunctional polyether based on ethylene oxide/propylene oxide having an average molar weight of 2250 (OHN=25)) and 1.2 g of the abovementioned hydrazine adduct of 1 mol of hydrazine hydrate and 2 mol of propylene carbonate of molecular weight 236, of the formula III, are metered in with stirring. The reaction mixture is subsequently heated to 90° C. and stirred at this temperature until the theoretical NCO value has been reached. After it has cooled to 65° C., 88.3 g of N-tert-butylbenzylamine are added dropwise with stirring over the course of 30 minutes at a rate such that the temperature of the mixture does not exceed 70° C. Then 1.5 g of Tinuvin® 770 DF (Ciba Spezialitaten GmbH, Lampertheim, Del.) are added, stirring is continued for 10 minutes and the reaction mixture is cooled to 60° C. Dispersing is carried out by adding 713.0 g of water (20° C.) at 60° C. over the course of 30 minutes. The subsequent stirring time at 40° C. is 1 hour.

A storage-stable aqueous dispersion of the blocked polyisocyanate is obtained, with a solids content of 27.3%.

Example 2 (Comparative Example)

147.4 g of a polyisocyanate based on 1,6-diisocyanato-hexane (HDI), containing biuret groups and having an NCO content of 23.0%, are taken at 40° C. Over the course of 10 minutes, 121.0 g of Polyether LB 25 (Bayer AG, DE, monofunctional polyether based on ethylene oxide/propylene oxide having an average molar weight of 2250 (OHN=25)) are metered in with stirring. The reaction mixture is subsequently heated to 90° C. and stirred at this temperature until the theoretical NCO value has been reached. After it has cooled to 65° C., 62.8 g of butanone oxime are added dropwise with stirring over the course of 30 minutes at a rate such that the temperature of the mixture does not exceed 80° C. Dispersing is carried out by adding 726.0 g of water (T=20° C.) at 60° C. over the course of 30 minutes. The subsequent stirring time at 40° C. is 1 hour.

A storage-stable aqueous dispersion of the blocked polyisocyanate is obtained, with a solids content of 30.0%.

The results shown in Table 1 demonstrate that, with the use of the water-dispersible, N-tert-butylbenzylamine-blocked crosslinker from Example 1 a substantially higher hydrolysis resistance is achieved than with prior art crosslinkers (Example 2). Furthermore, the tensile strength and elongation at break indicate that, with mixture 1 after a drying time of 10 minutes at 125° C., significantly higher mechanical properties are achieved, owing to the lower deblocking temperature of the blocking agent from crosslinker of Example 1 (N-tert-butylbenzylamine) as compared with mixture 2, which contains a crosslinker having a prior art blocking agent (butanone oxime) (Example 2).

TABLE 1

Results of the mechanical properties of free films produced from Examples 1 and 2 in combination with a binder

| | Mixture 1 (inventive) | Mixture 2 (comparative example) |
|---|---|---|
| Film-forming resin 2): | Baybond PU 401 | Baybond PU 401 |
| Proportion | 60% by weight | 60% by weight |
| Curing agent 1): | Dispersion from Example 1 (inventive) | Dispersion from Example 2 (comparative example) |
| Proportion | 40% by weight | 40% by weight |
| Blocking agent | N-tert-butylbenzyl-amine | Butanone oxime |
| Average particle size | 143 nm | 224 nm |
| Drying conditions | 10 min, 125° C. | 10 min, 125° C. |
| Preparation of the mixture | Addition of 1) to 2); 5 min stirring at room temperature | Addition of 1) to 2); 5 min stirring at room temperature |
| Tensile test: 0 value | | |
| 100% modulus [MPa] | 2.7 | 0.4 |
| Tensile strength [MPa] | 20.2 | 4.2 |
| Elongation at break [%] | 860 | 1540 |
| Tensile test after 7d hydrolysis | | |
| Tensile strength [MPa] | 19.8 | Run |
| Elongation at break [%] | 500 | Run |
| Tensile test, after 14d hydrolysis | | |
| Tensile strength [MPa] | 18.3 | Run |
| Elongation at break [%] | 240 | Run |
| Tensile test after 4 weeks hydrolysis | | |
| Tensile strength [MPa] | 12.2 | Run |
| Elongation at break [%] | 190 | Run |
| Tensile test after 6 weeks hydrolysis | | |
| Tensile strength [MPa] | 7.2 | Run |
| Elongation at break [%] | 130 | Run |
| Tensile test after 8 weeks hydrolysis | | |
| Tensile strength [MPa] | Run | Run |
| Elongation at break [%] | Run | Run |

Example 3 (Inventive)

13.5 g of Polyether LB 25 (Bayer AG, DE, monofunctional polyether based on ethylene oxide/propylene oxide having an average molar weight of 2250 (OHN=25)) and 122.6 g of N-tert-butylbenzylamine are initially taken and are heated to 90° C. with stirring. Then 193.0 of a polyisocyanate based on 1,6-diisocyanato-hexane (HDI), containing isocyanurate groups and having an NCO content of 21.8%, are added over the course of 30 minutes at a rate such that the temperature of the reaction mixture does not exceed 70° C. Following the addition of 11.1 g of the abovementioned hydrazine adduct of 1 mol of hydrazine hydrate and 2 mol of propylene carbonate, of molecular weight 236, stirring is continued at 70° C. until the theoretical NCO value has been reached. Then 3.5 g of Tinuvin® 770 DF (Ciba Spezialitaten GmbH, Lampertheim, Del.) are added over 5 minutes at 70° C. and the reaction mixture is stirred for a further 5 minutes. 24.6 g of the hydrophilicizing agent KV 1386 (BASF AG, Ludwigshafen, Del.) in solution in 73.7 g of water are metered in over the course of 2 minutes and the reaction mixture is stirred for 15 minutes more. Dispersing by adding 736.4 g of water (T=60° C.) in 10 min. The subsequent stirring time is 2 hours. A storage-stable dispersion is obtained having a solids of 27.6%.

Example 4 (Comparative Example)

963.0 g of a polyisocyanate based on 1,6-diisocyanato-hexane (HDI), containing biuret groups and having an NCO content of 23.0%, are mixed with 39.2 g of Polyether LB 25 (Bayer AG, DE, monofunctional polyether based on ethylene oxide/propylene oxide having an average molar weight of 2250 (OHN=25)) and 7.8 g of the abovementioned hydrazine adduct of 1 mol of hydrazine hydrate and 2 mol of propylene carbonate of molecular weight 236 at 100° C. for 30 minutes. Then 493.0 g of ϵ-caprolactam are added over the course of 20 minutes at a rate such that the temperature of the reaction mixture does not exceed 110° C. The mixture is stirred at 110° C. until the theoretical NCO value has been reached and is then cooled to 90° C. Following the addition of 7.9 g of Tinuvin® 770 DF (Ciba Spezialitaten GmbH, Lampertheim, Del.) and a subsequent stirring time of 5 minutes, a mixture of 152.5 g of the hydrophilicizing agent KV 1386 (BASF AG, Ludwigshafen, Del.) and 235.0 g of water is metered in over the course of 2 minutes and stirring is continued for 7 minutes more at neutral temperature. This is followed by dispersing, by adding 3341.4 g of water. After a subsequent stirring time of 4 hours, a storage-stable aqueous dispersion was obtained having a solids content of 29.9%.

TABLE 2

Results of the mechanical properties of free films produced from Examples 3 and 4 in combination with a binder

| | Mixture 3 (inventive) | Mixture 4 (comparative example) |
|---|---|---|
| Film-forming resin 2): | Baybond PU 401 | Baybond PU 401 |
| Proportion | 60% by weight | 60% by weight |
| Curing agent 1): | Dispersion from Example 3 (inventive) | Dispersion from Example 4 (comparative example) |
| Proportion | 40% by weight | 40% by weight |
| Blocking agent | N-tert-butylbenzyl-amine | ϵ-caprolactam |
| Average particle size | 95 nm | 235 nm |
| Drying conditions | 10 min, 125° C. | 10 min 125° C. |
| Preparation of the mixture | Addition of 1) to 2); 5 min stirring at room temperature | Addition of 1) to 2); 5 min stirring at room temperature |

TABLE 2-continued

Results of the mechanical properties of free films produced from Examples 3 and 4 in combination with a binder

| | Mixture 3 (inventive) | Mixture 4 (comparative example) |
|---|---|---|
| Tensile test: 0 value | | |
| 100% modulus [MPa] | 1.8 | 1.2 |
| Tensile strength [MPa] | 17.3 | 8.5 |
| Elongation at break [%] | 880 | 1020 |
| Tensile-test after 7d hydrolysis | | |
| Tensile strength [MPa] | 17.0 | has run |
| Elongation at break [%] | 480 | has run |
| Tensile test after 14d hydrolysis | | |
| Tensile strength [MPa] | 17.5 | has run |
| Elongation at break [%] | 300 | has run |
| Tensile test after 4 weeks hydrolysis | | |
| Tensile strength [MPa] | 12.8 | has run |
| Elongation at break [%] | 300 | has run |
| Tensile test after 6 weeks hydrolysis | | |
| Tensile strength [MPa] | 6.5 | has run |
| Elongation at break [%] | 160 | has run |
| Tensile test after 8 weeks hydrolysis | | |
| Tensile strength [MPa] | has run | has run |
| Elongation at break [%] | has run | had run |

The results shown in Table 2 demonstrate that, with the use of the water-dispersible, N-tert-butylbenzylamine-blocked crosslinker from Example 3 a substantially higher hydrolysis resistance is achieved than with prior art crosslinkers (Example 4). Furthermore, the tensile strength and elongation at break indicate that, with mixture 3 after a drying time of 10 minutes at 125° C., significantly higher mechanical properties are achieved, owing to the lower deblocking temperature of the blocking agent from the crosslinker of Example 3 (N-tert-butylbenzylamine) as compared with mixture 6, which contains a crosslinker having a prior art blocking agent (caprolactam) (Example 4).

Example 5 (Inventive)

192.6 g of a polyisocyanate based on 1,6-diisocyanato-hexane (HDI), containing biuret groups and having an NCO content of 23.0%, are mixed with 7.8 g of Polyether LB 25 (Bayer AG, DE, monofunctional polyether based on ethylene oxide/propylene oxide having an average molar weight of 2250 (OHN=25)) at 100° C. for 30 minutes. Then, at 70° C., 142.0 g of N-tert-butylbenzylamine are added over the course of 30 minutes at a rate such that the temperature of the reaction mixture does not exceed 75° C. The mixture is stirred at 75° C. until the theoretical NCO value has been reached. A mixture of 27.5 g of the hydrophilicizing agent KV 1386 (BASF AG, Ludwigshafen, Del.) and 46.8 g of water is metered in over the course of 2 minutes and stirring is continued for 7 minutes more at neutral temperature. This is followed by dispersing, by adding 761.3 g of water. After a subsequent stirring time of 4 hours, a storage-stable aqueous dispersion was obtained having a solids content of 28.0%.

Example 6 (Comparative Example)

963.0 g of a polyisocyanate based on 1,6-diisocyanato-hexane (HDI), containing biuret groups and having an NCO content of 23.0%, are mixed with 39.2 g of Polyether LB 25 (Bayer AG, DE, monofunctional polyether based on ethylene oxide/propylene oxide having an average molar weight of 2250 (OHN=25)) at 100° C. for 30 minutes. Then 493.0 g of ε-caprolactam are added over the course of 20 minutes at a rate such that the temperature of the reaction mixture does not exceed 110° C. The mixture is stirred at 110° C. until the theoretical NCO value has been reached and is then cooled to 90° C. Following a subsequent stirring time of 5 minutes, a mixture of 152.5 g of the hydrophilicizing agent KV 1386 (BASF AG, Ludwigshafen, Del.) and 235.0 g of water is metered in over the course of 2 minutes and stirring is continued for 7 minutes more at neutral temperature. This is followed by dispersing, by adding 3325.1 g of water. After a subsequent stirring time of 4 hours, a storage-stable aqueous dispersion is obtained having a solids content of 30.0%.

TABLE 3

Results of the mechanical properties of free films produced from Examples 5 and 6 in combination with a binder

| | Mixture 5 (inventive) | Mixture 6 (comparative example) |
|---|---|---|
| Film-forming resin 2): | Baybond PU 401 | Baybond PU 401 |
| Proportion | 60% by weight | 60% by weight |
| Curing agent 1): | Dispersion from Example 5 (inventive) | Dispersion from Example 6 (comparative example) |
| Proportion | 40% by weight | 40% by weight |
| Blocking agent | N-tert-butylbenzyl-amine | ε-caprolactam |
| Average particle size | 110 nm | 153 nm |
| Drying conditions | 10 min, 125° C. | 10 min, 125° C. |
| Preparation of the mixture | Addition of 1) to 2); 5 min stirring at room temperature | Addition of 1) to 2); 5 min stirring at room temperature |
| Tensile test: 0 value | | |
| 100% modulus [MPa] | 2.0 | 0.8 |
| Tensile strength [MPa] | 16.9 | 8.4 |
| Elongation at break [%] | 1020 | 1250 |
| Tensile-test after 7d hydrolysis | | |
| Tensile strength [MPa] | 17.8 | has run |
| Elongation at break [%] | 190 | has run |
| Tensile test after 14d hydrolysis | | |
| Tensile strength [MPa] | 18.0 | has run |
| Elongation at break [%] | 240 | has run |
| Tensile test after 4 weeks hydrolysis | | |
| Tensile strength [MPa] | 20.0 | has run |
| Elongation at break [%] | 210 | has run |
| Tensile test after 6 weeks hydrolysis | | |
| Tensile strength [MPa] | 15.7 | has run |
| Elongation at break [%] | 200 | has run |

The results shown in Table 3 demonstrate that, with the use of the water-dispersible, N-tert-butylbenzylamine-blocked crosslinker from Example 5, a substantially higher hydrolysis resistance is achieved than with prior art crosslinkers (Example 6). Furthermore, the tensile strength and elongation at break indicate that, with mixture 5 after a drying time of 10 minutes at 125° C., significantly higher mechanical properties are achieved, owing to the lower deblocking temperature of the blocking agent from crosslinker of Example 5 (N-tert-butylbenzylamine) as compared with mixture 6, which contains a crosslinker having a prior art blocking agent (caprolactam) (Example 6).

Mixtures 1–6 are processed to sizes for example as follows: About half of the water required is charged to a suitable mixing vessel and, with stirring, in succession, one of the abovementioned mixtures of film-forming resin 2) and crosslinker 1), lubricant 4) (e.g. Breox® 50-A 140, BP Chemicals) and, where appropriate, other, customary auxiliaries 5, 6) are added. Thereafter the pH is adjusted to 5–7 and then hydrolysate of 3-aminopropyltriethoxysilane (A1100) prepared according to the specifications of the manufacturer (e.g. UCC, New York) is added. After a further stirring time of 15 minutes, the size is ready to use; where appropriate, the pH is readjusted to 5–7. The sizes thus resulting from mixture 1, 3 and 5 are then sizing compositions according to the invention.

|  | Size 1 | Size 2 | Size 3 | Size 4 | Size 5 | Size 6 |
| --- | --- | --- | --- | --- | --- | --- |
| Water | 42.0 kg | 42.0 kg | 42.0 kg | 42.0 kg | 42.0 kg | 42.0 kg |
| Binder | 15.0 kg mixture 1 | 15.0 kg mixture 2 | 15.0 kg mixture 3 | 15.0 kg mixture 4 | 15.0 kg mixture 5 | 15.0 kg mixture 6 |
| A 1100 | 0.6 kg | 0.6 kg | 0.6 kg | 0.6 kg | 0.6 kg | 0.6 kg |
| Breox ® 50-A140 | 0.4 kg | 0.4 kg | 0.4 kg | 0.4 kg | 0.4 kg | 0.4 kg |
| Water | 42.0 kg | 42.0 kg | 42.0 kg | 42.0 kg | 42.0 kg | 42.0 kg |
| Total | 100.0 kg | 100.0 kg | 100.0 kg | 100.0 kg | 100.0 kg | 100.0 kg |

Then, in a conventional manner, glass fibres were produced, sized with the inventive sizes 1, 3 and 5 and with the sizes of the Comparative Examples 2, 4 and 6, chopped and dried. The glass fibres were compounded into a polyamide for reinforcement. The results of the free films of the mixtures are comparable to a very high degree with the results of the sizes on the glass fibre in respect of hydrolysis stability and mechanical properties. The mechanical properties of the inventive sizes prepared from mixtures 1, 3 and 5 show significantly improved mechanical properties and strongly improved hydrolysis resistances on the glass fibre in comparison with the sizes from mixtures 2, 4 and 6.

Although the invention has been described in detail in the foregoing for the purpose of illustration, it is to be understood that such detail is solely for that purpose, and that variations can be made therein by those skilled in the art without departing from the spirit and scope of the invention except as it may be limited by the claims.

What is claimed is:

1. Sizing composition comprising:
    1) water-dispersible and/or water-soluble, aralkylamine-blocked polyisocyanates, which have been synthesized from
        A) from 20 to 80% by weight of at least one polyisocyanates containing aliphatically, cycloaliphatically, araliphatically and/or aromatically attached isocyanate groups,
        B) from 1 to 40% by weight of at least one ionic and/or potential ionic and/or nonionic compound,
        C) from 15 to 60% by weight of at least one blocking agent of which at least 20% by weight consists of aralkylamines,
        D) one or more (cyclo)aliphatic monoamines and/or polyamines having from 1 to 4 amino groups, from the molecular weight range up to 300, present in an amount up to 15% by weight,
        E) one or more polyhydric alcohols having from 1 to 4 hydroxyl groups, from the molecular weight range up to 250, present in an amount up to 15% by weight,
        F) from 0 to 15% by weight of a stabilizer or stabilizer mixture, and
        G) from 0 to 20% by weight of at least one solvent, wherein the sum of A) to G) adds up to 100% by weight,
    2) film-forming resins,
    3) coupling agents, and
    4) lubricants.

2. Sizing composition according to claim 1, wherein the water-dispersible and/or water-soluble blocked polyisocyanates 1) has been synthesized from:
    A) from 25 to 75% by weight of at least one polyisocyanate containing aliphatically, cycloaliphatically, araliphatically and/or aromatically attached isocyanate groups,
    B) from 1 to 35% by weight of at least one ionic and/or potentially ionic and/or nonionic compound,
    C) from 20 to 50% by weight of at least one blocking agent of which at least 20% by weight consists of aralkylamines,
    D) one or more (cyclo)aliphatic monoamines and/or polyamines having from 1 to 4 amino groups, from the molecular weight range up to 300, present in an amount up to 10% by weight,
    E) one or more polyhydric alcohols having from 1 to 4 hydroxyl groups, from the molecular weight range up to 250, present in an amount up to 10% by weight,
    F) from 0 to 15% by weight of a stabilizer or stabilizer mixture, and
    G) from 0 to 15% by weight of at least one solvent, wherein the sum of A) to G) adds up to 100% by weight.

3. Sizing composition according to claim 1, wherein the water-dispersible and/or water-soluble blocked polyisocyanates 1) has been synthesized from:
    A) from 30 to 70% by weight of at least one polyisocyanate containing aliphatically, cycloaliphatically, araliphatically and/or aromatically attached isocyanate groups,
    B) from 5% to 30% by weight of at least one ionic and/or potentially ionic and/or nonionic compound,
    C) from 25 to 45% by weight of at least one blocking agent of which at least 20% by weight consists of aralkylamines,
    D) one or more (cyclo)aliphatic monoamines and/or polyamines having from 1 to 4 amino groups, from the molecular weight range up to 300, present in an amount up to 5% by weight, E) one or more polyhydric alcohols having from 1 to 4 hydroxyl groups, from the molecular weight range up to 250, present in an amount up to 5% by weight, F) from 0 to 5% by weight of a stabilizer or stabilizer mixture, and G) from 0 to 10% by weight of at least one solvent, wherein the sum of A) to G) adds up to 100% by weight.

4. Sizing composition according to claim 1, wherein the at least one polyisocyanate containing aliphatically, cycloaliphatically, araliphatically and/or aromatically attached isocyanate groups A) of the water-dispersible and/or water-soluble blocked polyisocyanate 1) has an isocyanate group (non-blocked and blocked) content of from 5.0 to 27.0% by weight.

5. Sizing composition according to claim 1, wherein the at least 50% of the isocyanate groups of the at least one polyisocyanate containing aliphatically, cycloaliphatically, araliphatically and/or aromatically attached isocyanate groups A) of the water-dispersible blocked and/or water-soluble polyisocyanates 1) are in blocked form.

6. Sizing composition according to claim 1, wherein the water-dispersible and/or water-soluble blocked polyisocyanates 1) comprises secondary benzylamine blocking agents.

7. Sizing composition according to claim 1, wherein the water-dispersible and/or water-soluble blocked polyisocyanates 1) comprises N-tertbutyl benzylamine blocking agent.

8. Method for sizing glass fibers, comprising applying the sizing composition according to claim 1 to the glass fibers.

9. The method according to claim 8, wherein the solution or dispersion of component 1) has a solids content of from 10 to 70% by weight.

10. Method for sizing glass fibers, comprising applying the sizing composition according to claim 1 to glass fibers, wherein the solution or dispersion of the polyisocyanate 1) has a fraction of less than 15% by weight of solvent G) in the overall composition of component 1).

11. Glass fibers sized with the sizing composition according to claim 1.

12. The sizing composition according to claim 1, further comprising at least one of antistats, further additives and auxiliaries.

* * * * *